United States Patent
Koch

[11] 3,979,389
[45] Sept. 7, 1976

[54] SULPHONATED COUMARIN DERIVATIVES

[75] Inventor: Werner Koch, Oberwil, Switzerland

[73] Assignee: Sandoz Ltd., Basel, Switzerland

[22] Filed: Oct. 15, 1974

[21] Appl. No.: 514,608

[30] Foreign Application Priority Data
Oct. 17, 1973  Switzerland.................. 14712/73

[52] U.S. Cl. .......................................... 260/256.5 R
[51] Int. Cl.[2] ...................................... C07D 239/72
[58] Field of Search ........................... 260/256.5 R

[56] References Cited
UNITED STATES PATENTS
3,763,178  10/1973  Sulkowski .................. 260/309.6

OTHER PUBLICATIONS
Nocler, Chemistry of Organic Compounds (Textbook), Pub., W. B. Saunders Co., 3rd Ed., 1965, p. 471.
Chemical Abstracts, 80:49259g & 49260a (1974).

*Primary Examiner*—Leonard Schenkman
*Attorney, Agent, or Firm*—Gerald D. Sharkin; Richard E. Vila; Joseph J. Borovian

[57] ABSTRACT

The present invention provides compounds of formula I,

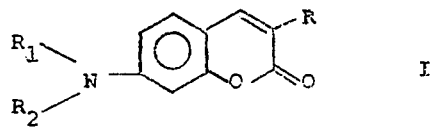

in which, either $R_1$ signifies an unsubstituted or substituted $(C_{1-4})$ alkyl radical, $R_2$ signifies a hydrogen atom or an unsubstituted or substituted $(C_{1-4})$ alkyl radical, or, $R_1$ and $R_2$, together with the nitrogen atom to which they are attached, form a pyrrolidine, piperidine or morpholine ring, R signifies a group of formula (a) or (b),

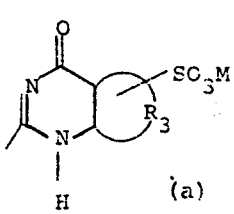 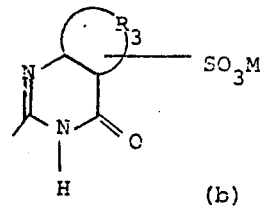

in which $R_3$ signifies a condensed further unsubstituted or substituted pyrimidine, pyridine or benzene ring or a condensed further unsubstituted naphthalene ring, and M signifies a hydrogen ion or a cation equivalent, which compounds are useful as anionic dyes.

12 Claims, No Drawings

SULPHONATED COUMARIN DERIVATIVES

IMPROVEMENTS IN OR RELATING TO ORGANIC COMPOUNDS

The present invention relates to sulphonated coumarin derivatives.

More particularly, the present invention provides compounds of formula I,

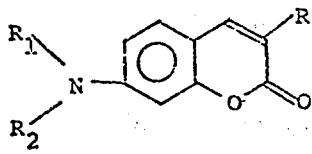

in which, either $R_1$ signifies an unsubstituted $(C_{1-4})$ alkyl radical or a $(C_{1-4})$ alkyl radical substituted by chlorine or cyano, $R_2$ signifies a hydrogen atom, an unsubstituted $(C_{1-4})$ alkyl radical or a $(C_{1-4})$ alkyl radical substituted by chlorine or cyano, or, $R_1$ and $R_2$, together with the nitrogen atom to which they are bound, form a pyrrolidine, piperidine or morpholine ring, and R signifies either a group of formula (a) or (b)

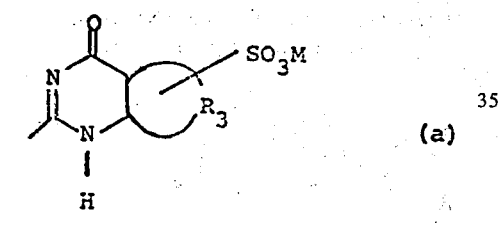

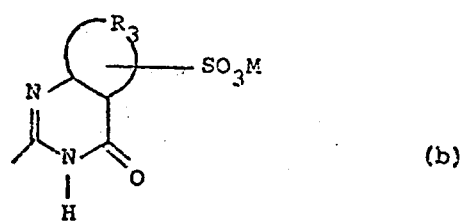

in which, $R_3$ signifies a condensed further unsubstituted pyrimidine or pyridine ring; a condensed pyrimidine or pyridine ring further substituted by a halogen atom or an $(C_{1-4})$ alkyl radical; a condensed further unsubstituted naphthalene or benzene ring; or a condensed benzene ring further substituted by a total of up to two substituents selected from up to two halogen atoms and/ or $(C_{1-4})$ alkyl or $(C_{1-4})$ alkoxy groups, and/or one nitro, $R'$—CO— or $R'$—CO—NH— group, where $R'$ signifies a $(C_{1-4})$ alkyl radical, and M signifies a hydrogen ion or a cation equivalent.

All the alkyl radicals in the compounds of formula I, may be straight chain or branched. If $R_1$ or $R_2$ signifies an unsubstituted alkyl radical, it is preferably linear; if it signifies a substituted alkyl radical the alkyl radical preferably contains 2 or 3 carbon atoms, e.g. 2-chloroethyl-1, 2-cyanoethyl-1, 1-chloropropyl-2, 1-cyanopropyl-2 or 2-cyanopropyl-1. Preferably $R_2$ has one of the significances given for $R_1$; more preferably it has the same significance.

The preferred alkyl substituent on the pyrimidine or pyridine ring as $R_3$ is methyl. The alkyl and alkoxy radicals as substituents on the fused benzene ring are preferably ethyl, ethoxy, methyl and methoxy with the latter two being more preferred. However, apart from the sulpho group borne thereby, any fused benzene ring as $R_3$ is preferably not substituted by more than one substituent and is more preferably unsubstituted.

When $R_3$ signifies a condensed naphthalene ring examples are naphtho-1,2 and naphtho-2,3 and the sulpho group is preferably on the ring remote from the coumarin nucleus.

M may be hydrogen or any cation usually employed in anionic dyes, for example alkali metal cations, ammonium, mono-, di- or tri($C_{2-3}$alkanol)-ammonium or mono-, di-, tri or tetra-$Cl_{1-4}$alkyl)-ammonium, with alkali metal cations such as lithium, sodium or potassium being preferred cations, particularly the sodium cation. For the sake of simplicity, M is shown herein to be monovalent. It may, however, be di- or polyvalent.

By "halogen" is meant chlorine or bromine, chlorine being preferred.

The present invention also provides a process for the production of compounds of formula I, as defined above, comprising i. sulphonating a compound of formula II,

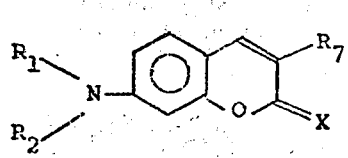

in which
$R_1$ and $R_2$ are as defined above,
X signifies O or NH, and
$R_7$ signifies a radical of formula ($a_1$) or ($b_1$)

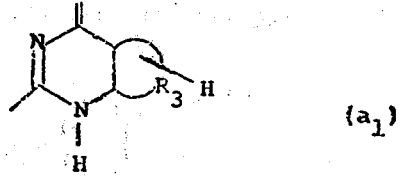

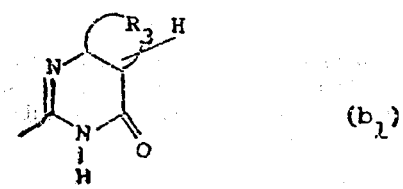

in which $R_3$ is as defined above,
ii. condensing a compound of formula III,

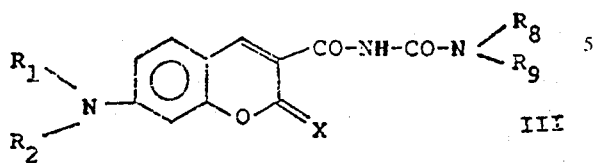

III in which,
R₁, R₂ and X are as defined above,
R₈ signifies a hydrogen atom or an unsubstituted or substituted ($C_{1-4}$) alkyl or phenyl radical,
R₉ signifies a hydrogen atom or an unsubstituted or substituted ($C_{1-4}$) alkyl radical, with a compound of formula IV,

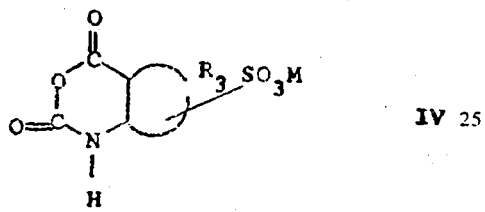

IV in which R₃ and M are as defined above, and if necessary hydrolysing the =NH group to =C,
iii. reacting a compound of formula V,

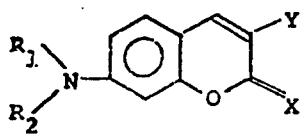

V in which,
R₁, R₂ and X are as defined above, and
Y signifies a carboxy, alkoxycarbonyl, carbamoyl or -CO- Hal radical in which Hal signifies a chlorine or bromine atom, with a compound of formula VI,

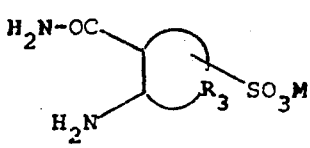

VI in which R₃ and M are as defined above, and, if necessary, hydrolysing the =NH group to =O,
iv. reacting a compound of formula VII,

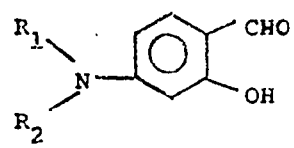

VII in which,
R₁ and R₂ are as defined above with a compound of formula VIII,

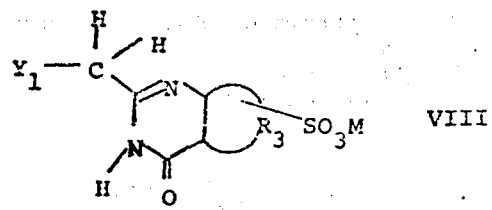

VIII in which,
Y₁ signifies carboxy, alkoxycarbonyl, carbamoyl or cyano, and
R₃ and M are as defined above, and, if necessary, hydrolysing the =NH group to =O,
v. reacting a compound of formula IX,

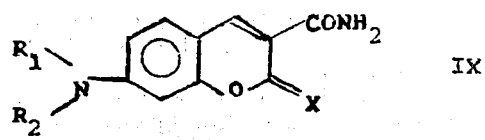

IX in which R₁, R₂ and X are as defined above, with a compound of formula IV, as defined above, and, if necessary, hydrolysing the =NH group to =O,
vi. or reacting a compound of formula X,

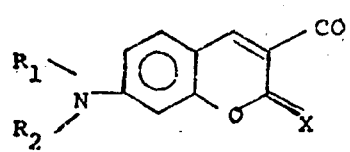

X in which R₁, R₂, R₃, X and M are as defined above, with urethane, and, if necessary, hydrolising the =NH group to =O. In the compounds of formula II, III, V, IX and X, X is preferably =O.

The sulphonation reaction (i) may be effected in accordance with known methods, for example, in sulphuric acid, principally with oleum, sulphur trioxide, or an agent which evolves SO₃, in the presence or absence of an organic solvent. Further, sulphonation may also be effected with chlorosulphonic acid.

The treatment with SO₃ (as gas, for example, diluted with air or as the addition compound to pyridine or dioxane) or chlorosulphonic acid may, for example, be effected in an inert solvent, such as chloroform, 1,2-dichloroethane or nitrobenzene. A suitable temperature is in the range of from 0° to 70°C, preferably from 15° to 30°C. Generally, sulphonation is effected at the above stated termperatures with concentrated sulphuric acid (96 – 100 %) or with oleum which preferably has a SO₃ content of 30 – 75 %. If, in the compound of formula II, X signifies a =NH group this group is hydrolysed to =O during the sulphonation reaction.

Reaction (ii) is effected in an analogous manner to that described in DOS Nos. 2,306,843 and 2,306,740, i.e. at temperatures ranging from 160° – 240°C and preferably in anhydrous medium. Preferably the reaction is carried out in the melt. It is also possible to effect the reaction in organic solvent or a mixture of solvents wherein at least one, but preferably both, of the reaction components are dissolved. Suitable solvents include alcohols; amide (dimethyl formamide, hexamethyl phosphorous amide, dimethyl acetamide); glycols; di- or tri-chlochlorobenzene; dimethyl sulphoxide; or dioxane.

Reaction (iii) may be carried out in the melt or in an inert solvent of high boiling point such as diphenyl, diphenyl ether or di- or trichlorobenzene, however solvents, in which both reaction components are dissolved, are preferably employed, e.g. those listed above for reaction (ii). Suitable temperatures for reaction (iii) are those in the range of from 150°C to 260°C.

Reaction (iv) is suitably carried out in solvents such as those mentioned above for reaction (ii), preferably in the presence of a basic catalyst such as piperidine, triethylamine, etc. Suitable temperatures for the reaction are in the range from room temperature to reflux temperature. The reaction is conveniently completed by heating, for example, in the presence of an acid.

If $Y_1$ signifies CN, the corresponding coumarinimide compound is formed, this may be subsequently saponified to the coumarin compound in acid medium. Thus, if the reaction is effected in the presence of an acid, the coumarin compound is formed directly.

Reaction (v) may be conveniently effected at a temperature in the range of from 140°C to 260°C. The reaction may be conducted in the presence or absence of an inert solvent. Preferably it is conducted in the presence of an acid adjuvant such as boric acid, aluminium chloride or zinc chloride.

Reaction (vi) is suitably carried out in the presence of an ethanol acceptor such as phosphorous pentoxide or pyrophosphoric acid, preferably by heating to reflux temperature in the presence of an inert solvent.

In the above mentioned reactions, where necessary, the group =NH may be converted into =O according to known methods, for example by treatment with acids with heating.

It is believed that reaction (ii), above, yields compounds of formula I in which R is of formula (a) and that processes (iii) to (vi) yield compounds of formula I in which R is of formula (b). Analytical methods thus far applied to determined which respective structure is formed have, however, failed to resolve the point. The compounds of formula I may also be produced by reacting the corresponding unsulphonated starting materials of process (ii) to (vi) and subsequently sulphonating the product. The starting materials for such reactions and the reactions of the unsulphonated starting materials may be carried out as described in DOS Nos. 2,306,843, 2,306,740 and 2,005,933. Sulphonation may be carried out as described above for process (i).

Preferred compounds of formula I are those of formula Ia,

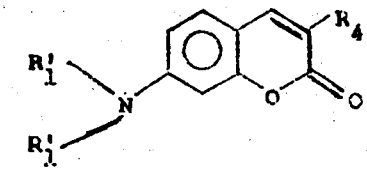

Ia in which each $R_1'$, which may be the same or different, signifies a $(C_{1-4})$alkyl radical or a $(C_{2-3})$alkyl radical substituted by chlorine or cyano, $R_4$ signifies a radical of formula (c), (d), (e) or (f),

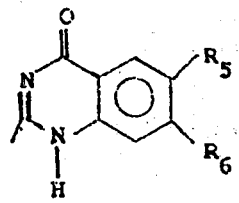

(c)

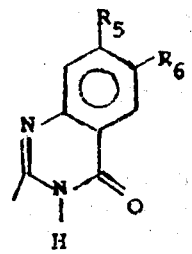

(d)

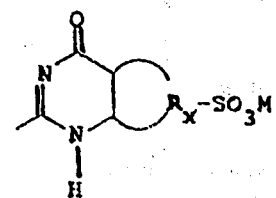

(e)

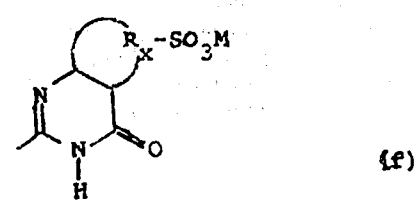

(f)

in which one of $R_5$ and $R_6$ signifies —$SO_3M$, where M is as defined above, and the other signifies a hydrogen, chlorine or bromine atom, a ($C_{1-4}$)alkyl, ($C_{1-4}$)alkoxy, ($C_{1-4}$)alkylcarbonyl or ($C_{1-4}$)alkylcarbonylamino, and $R_r$ signifies the atoms necessary to form a condensed naphtho-1,2- or -2,3-nucleus in which the $SO_3M$ group is bound to the ring remote from the coumarin nucleus.

$R_4$ preferably signifies a radical of formula (c) or (d).

Among the compounds of formula Ia, those where $R_4$ signifies a radical of formula (c) or (d) in which one of $R_5$ and $R_6$ signifies $SO_3M$ and the other signifies a hydrogen, chlorine or bromine atom or a methyl group, and each $R_1'$ signifies an ethyl β-chloroethyl or β-cyanoethyl group are preferred.

The starting materials of formula II to X may be obtained in accordance with known methods. Thus, for example, the compounds of formula III and those of formula II where R is a radical of formula ($a_1$) may be prepared as described in DOS No. 2,306,740. The compounds of formula II, where R is a radical of formula ($b_1$) may be prepared as described in DOS No. 2,005,933. The compounds of formula IV may be prepared in accordance with the procedures described in German Patent Nos. 499,822 and 500,916.

The compounds of formula VI may be produced, for example, by sulphonating compounds of formula XVI,

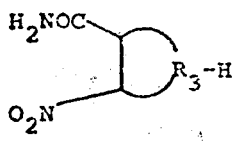

XVI in which $R_3$ is as defined above, and subsequently reducing the nitro group, or they may be obtained in known manner from the corresponding orthoaminocarboxy compounds of formula XVII,

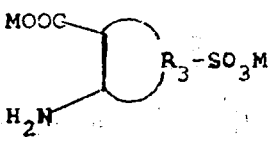

XVII in which each M and $R_3$ are as defined above.

The compounds of formula VII may be produced in accordance with known methods.

The compounds of formula VIII may, for example, be produced in accordance with the Niementowsky method, or in analogy with this method by reacting a compound of formula XVII, as defined above, or an appropriate functional derivative thereof, e.g. the amide, with a compound of formula XVIII, $Y_1$-$CH_2$-CN      XVIII in which $Y_1$ is as defined above.

The compounds of formula X may be prepared by reacting a compound of formula VII with a compound of formula XIX,

in which $Y_1$, $R_3$ and M are as defined above, in a manner analogous to that described in DOS No. 2,005,933, where the compounds of formula XIX are obtainable in conventional manner from the corresponding amines of formula XX,

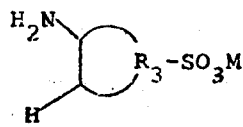

XX in which $R_3$ and M are as defined above, and appropriate malonic acid derivatives thereof.

It will be appreciated that, both the final products and the sulphonated intermediates produced may be converted from the free acid to the salt form or vice-versa in conventional manner.

The compounds of formula I, are useful as anionic dyestuffs for dyeing organic substrates of natural or synthetic material. Examples of substrates capable of being dyed with such compounds are substrates consisting of or comprising natural or regenerated cellulose, basically modified polypropylene, polyurethanes or natural or synthetic polyamides. The substrate may be in loose fibre, yarn or fabric form.

The dyeings may be effected by methods known per se, e.g. continuous or discontinuous methods such as exhaust, padding or printing methods. The compounds of formula I are suited for dyeing by continuous dipping processes but are particularly suited for dyeing from a long bath or by exhaust dyeing processes.

The compounds of the inventions may be applied from a neutral to acid bath and are thus particularly suited for dyeing synthetic polyamides. They show notable migration, have good build-up power and cover stripily dyeing nylon. The dyeings obtained possess notable wetfastness, rubbing fastness and stability towards acid or alkali; they are stable to pH and have good water solubility in the form of their alkali metal salts.

The compounds of formula I, in the salt form, are also suitable for spin dyeing of plastics in the mass dissolved in organic, preferably polar solvents. Furthermore, they are useful for dyeing plastics and lacquers, and for colour printing preparations.

The following Examples serve to further illustrate the invention. In the Examples all parts and percentages are by weight and all temperatures are in degrees centigrade, unless otherwise stated.

EXAMPLE 1

18 Parts of a compound produced in accordance with the description in German published application No. 2,306,740 or 2,306,843, of formula

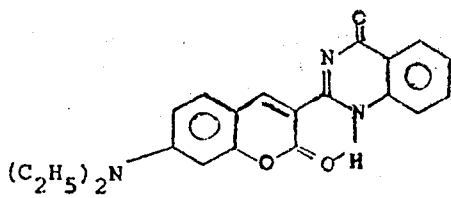

are entered over the course of 2 hours into 250 parts of 65–70 % oleum. The temperature is kept at 5° – 10° by external cooling. The reaction temperature is then allowed to rise to room temperature. The reaction mixture is then heated to 60° – 65° over the course of 45 minutes and stirred at this temperature over the course of 120 minutes. It is then cooled and the reduction product is poured on to 3000 parts of a mixture of ice/brine. 200 Parts of sodium chloride are added to the mixture which is then heated to 90°. After cooling, filtration is effected and the filtrate is washed with 100 parts of brine. The resulting product is dried at 80° in a vacuum. A chromatographically purified sample of the obtained product in dimethyl formamide as solvent shows an absorption maximum at a wave length of 450 – 451 mu ($\epsilon \cong 37000$).

The resulting compound of formula

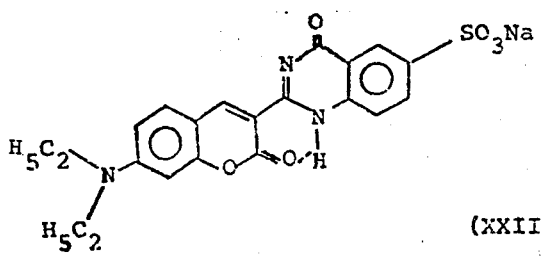

dyes nylon in a yellow fluorescent shade with good allround fastness.

EXAMPLE 2

30.3 Parts of a compound produced in accordance with the description in German published application No. 2,306,740 or 2,306,843, of formula

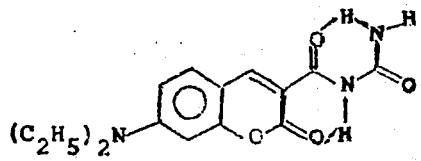

and 26.5 parts of the sodium salt of the 5-sulpho-isatoic acid anhydride, produced in accordance with German patent as issued by the former German Patent Office ("DRP"), No. 499,822, are mixed intimately and the stirred reaction mixture is gradually heated to melting temperature (~250°) under a nitrogen atmosphere. Condensation is effected within 2 hours with powerful evolution of ammonia and carbon dioxide. After cooling to room temperature, the product is filtered off and the impurities are removed by washing it well with a small quantity of ethanol.

The product obtained in this way is subsequently dried at 100° in a vacuum. The product is identical with that of Example 1.

EXAMPLE 3

20 Parts of the compound of formula

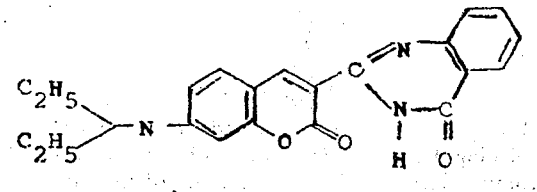

produced in accordance with the description in Example 33 of German published application No. 2,005,933, are entered at room temperature over the course of 3 hours into 300 parts of 65 % oleum. The reaction mixture is heated to 65° over the course of 1 hour and stirred at this temperature for 3 hours. Working up is effected in accordance with Example 1.

The compound has the same dyeing properties as the compound of Example 1.

EXAMPLE 4

By replacing the 18 parts of the compound of formula (XXI) in Example 1 with the corresponding amount of the compound of formula

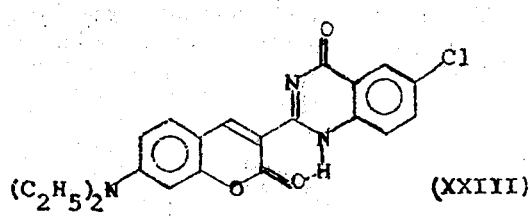

or replacing the 265 parts of the sodium salt of the 5-sulpho-isatoic acid anhydride in Example 2 with the corresponding amount of the sodium salt of the 5-chloro-4-sulpho-isatoic acid anhydride and employing the procedure described in Example 1 or 2, the compound of formula

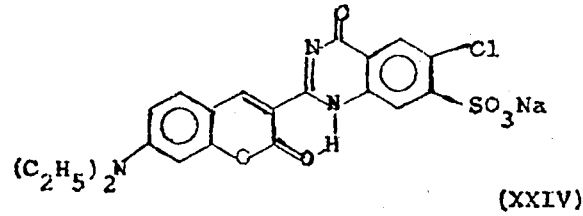

(XXIV)

is obtained.

EXAMPLE 5

Using the procedure as described in Example 4 but replacing the chlorine derivatives by the corresponding bromine derivatives, the compound of formula

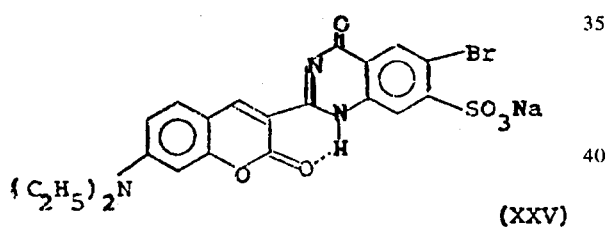

(XXV)

is obtained.

The following Table contains further compounds according to the invention which agree with the general formula

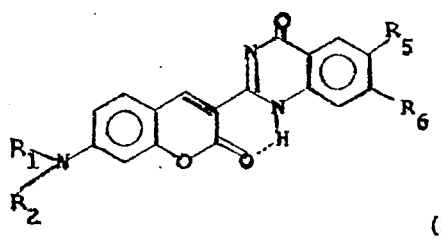

(XXVI)

They may be produced in analogy with the processes described in Example 1 or 2, and dye nylon substrates in a yellowish fluorescent shade.

TABLE

| Ex. No. | $R_1$ | $R_2$ | $R_5$ | $R_6$ |
|---|---|---|---|---|
| 6 | $-C_2H_5$ | $-C_2H_5$ | $-COCH_3$ | $-SO_3Na$ |
| 7 | '' | '' | $-CH_3$ | '' |
| 8 | '' | '' | $-OCH_3$ | '' |
| 9 | '' | '' | $-NHCOCH_3$ | '' |
| 10 | '' | '' | $-SO_3Na$ | $-CH_3$ |
| 11 | $-CH_2CH_2CN$ | $-CH_2CH_2CN$ | $-SO_3Na$ | $-H$ |
| 12 | '' | '' | $-Cl$ | $-SO_3Na$ |
| 13 | '' | '' | $-Br$ | '' |
| 14 | '' | '' | $-COCH_3$ | '' |
| 15 | '' | '' | $-CH_3$ | '' |
| 16 | '' | '' | $-OCH_3$ | '' |
| 17 | '' | '' | $-NHCOCH_3$ | '' |
| 18 | $-CH_2CH_2Cl$ | $-CH_2CH_2Cl$ | $-SO_3Na$ | H |
| 19 | '' | '' | $-Cl$ | $SO_3Na$ |
| 20 | '' | '' | $-Br$ | '' |
| 21 | '' | '' | $-COCH_3$ | '' |
| 22 | '' | '' | $-CH_3$ | '' |
| 23 | '' | '' | $-OCH_3$ | '' |
| 24 | '' | '' | $-NHCOCH_3$ | '' |

Starting from the compounds of formulae

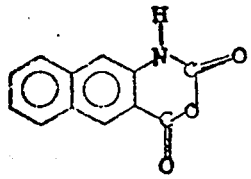

(XXVII)

or

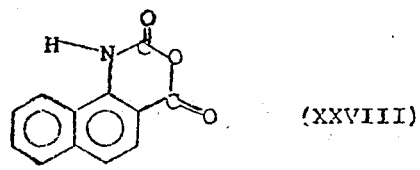

(XXVIII)

the following compounds may be produced in accordance with the process described in Example 1.

EXAMPLE 25

Believed formula

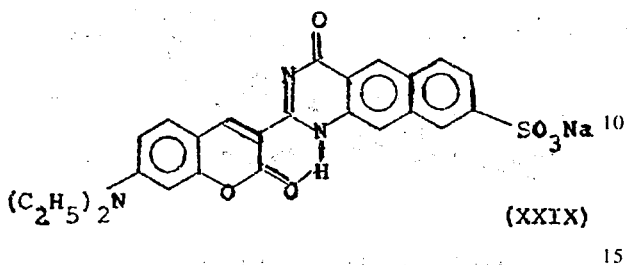

(XXIX)

EXAMPLE 26

Believed formula

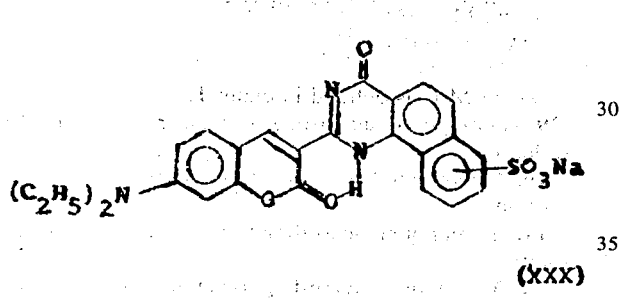

(XXX)

APPLICATION EXAMPLE A

A dyebath is prepared with 4000 parts of water, 10 parts of anhydrous sodium sulphate and 2 parts of the dye of Example 1. After previous wetting out, 100 parts of a nylon fabric are entered into the bath at 40°.

The bath is raised to the boil over the course of 30 minutes and held at the boil for 1 hour. 4 Parts of glacial acetic acid are added and dyeing is continued for a further 30 minutes. The water lost by evaporation is continuously replaced during dyeing. On removal from the bath, the nylon fabric dyed in a yellow fluorescent shade is rinsed with water and dried. Wool may be dyed in accordance with the same process. The dyeings have good light and wet fastness.

The dyes of Examples 3 to 26 may be employed in analogous manner.

What is claimed is:
1. A compound of the formula Ia,

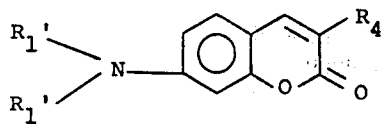

Ia in which,
each $R_1'$, which may be the same or different, is $(C_{1-4})$ alkyl or $(C_{2-3})$ alkyl substituted by chloro or cyano,
$R_4$ is a radical of formula (c), (d), (e) or (f),

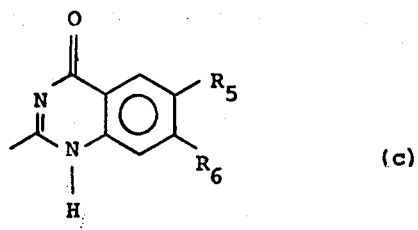

(c)

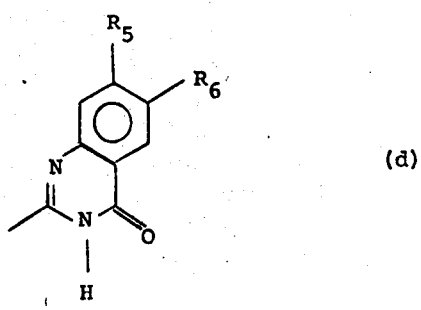

(d)

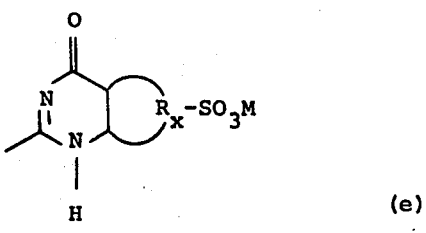

(e)

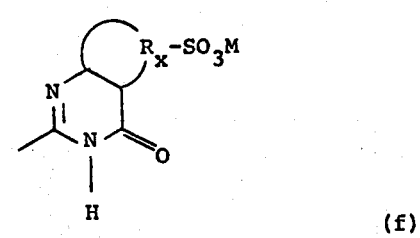

(f)

in which,
one of $R_5$ and $R_6$ is $-SO_3M$, where M is a hydrogen ion or a cation equivalent, and the other is hydrogen, chloro, bromo, $(C_{1-4})$ alkyl, $(C_{1-4})$ alkoxy, $(C_{1-4})$ alkylcarbonyl or $(C_{1-4})$ alkylcarbonylamino, and $R_r$ is the atoms necessary to form a condensed further unsubstituted 1,2- or 2,3-naphthalene ring in which the $SO_3M$ group is bound to the ring remote from the coumarin nucleus.

2. A compound according to claim 1, in which $R_4$ is a radical of formula (c) or (d), as defined in Claim 1.

3. A compound according to claim 1, in which each $R_1'$ is ethyl, β-chloroethyl or β-cyanoethyl and $R_4$ is a radical of formula (c) or (d), in which one of $R_5$ and $R_6$ is —$SO_3M$ and the other is hydrogen, chloro, bromo or methyl.

4. A compound according to claim 1, in which the $R_1$ s are the same.

5. A compound according to claim 1, of formula

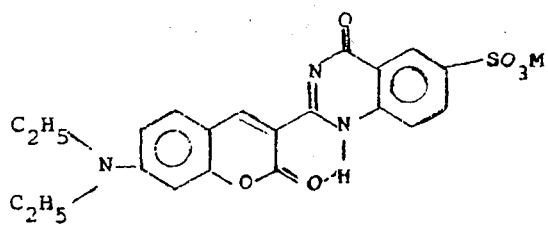

in which M is as defined in claim 1.

6. A compound according to claim 1, of formula

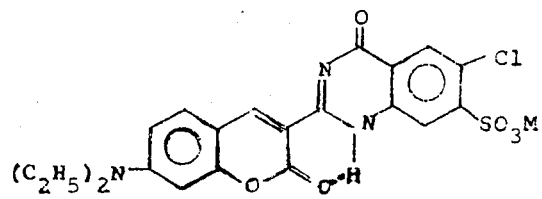

in which M is as defined in Claim 1.

7. A compound according to claim 1, of formula

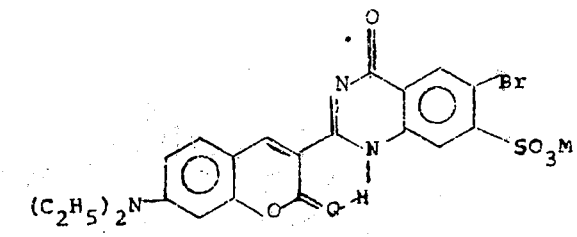

in which M is as defined in claim 1.

8. A compound according to claim 1, of formula

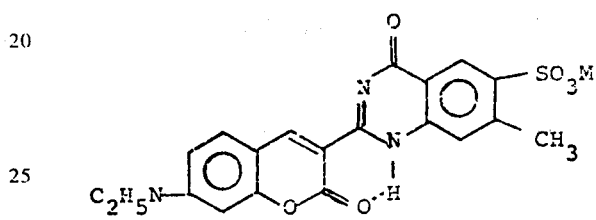

in which M is as defined in claim 1.

9. A compound according to claim 5, in which M is sodium.

10. A compound according to claim 6, in which M is sodium.

11. A compound according to claim 7, in which M is sodium.

12. A compound according to claim 8, in which M is sodium.

* * * * *